United States Patent
Wang

(10) Patent No.: US 11,258,844 B2
(45) Date of Patent: Feb. 22, 2022

(54) BLUETOOTH TRANSMISSION CONTROL METHOD, CONTROL SYSTEM, AND STORAGE MEDIUM

(71) Applicant: HuiZhou TCL Mobile Communication Co., Ltd., HuiZhou (CN)

(72) Inventor: Dapeng Wang, HuiZhou (CN)

(73) Assignee: HuiZhou TCL Mobile Communication Co., Ltd., HuiZhou (CN)

( * ) Notice: Subject to any disclaimer, the term of this patent is extended or adjusted under 35 U.S.C. 154(b) by 0 days.

(21) Appl. No.: 16/976,109

(22) PCT Filed: Feb. 27, 2019

(86) PCT No.: PCT/CN2019/076365
§ 371 (c)(1),
(2) Date: Aug. 27, 2020

(87) PCT Pub. No.: WO2019/165983
PCT Pub. Date: Sep. 6, 2019

(65) Prior Publication Data
US 2020/0412792 A1    Dec. 31, 2020

(30) Foreign Application Priority Data
Feb. 28, 2018 (CN) .......................... 201810166001.1

(51) Int. Cl.
*H04L 29/08* (2006.01)
*H04M 1/72412* (2021.01)
*H04M 1/72442* (2021.01)

(52) U.S. Cl.
CPC .......... *H04L 67/06* (2013.01); *H04L 67/025* (2013.01); *H04L 67/125* (2013.01); *H04M 1/72412* (2021.01); *H04M 1/72442* (2021.01)

(58) Field of Classification Search
CPC ..... H04L 67/06; H04L 67/025; H04L 67/125; H04M 1/72412; H04M 1/72442
See application file for complete search history.

(56) References Cited

U.S. PATENT DOCUMENTS

2005/0190700 A1* 9/2005 Melpignano .......... H04W 74/06
370/244
2007/0162437 A1 7/2007 Hwang
(Continued)

FOREIGN PATENT DOCUMENTS

CN   1996236    7/2007
CN   101621745  1/2010
(Continued)

OTHER PUBLICATIONS

International Search Report and the Written Opinion dated May 29, 2019 From the International Searching Authority Re. Application No. PCT/CN2019/076365 and Its Translation of Search Report Into English. (9 Pages).

*Primary Examiner* — Wing F Chan
*Assistant Examiner* — Billy H Ng

(57) ABSTRACT

A Bluetooth transmission control system, a control system and a storage medium are provided. The Bluetooth transmission control method comprises: establishing a Bluetooth connection with a file receiving device by a mobile terminal, and the mobile terminal initiating a Bluetooth file transmission operation to the file receiving device; detecting whether the mobile terminal synchronously turns on a Bluetooth music playback operation or not; negotiating a file transmission timeout period with the file receiving device by the mobile terminal based on a detection result; and transmitting a file to the file receiving device by the mobile terminal.

16 Claims, 4 Drawing Sheets

(56) References Cited

U.S. PATENT DOCUMENTS

| | | | |
|---|---|---|---|
| 2007/0226034 A1 | 9/2007 | Khan | |
| 2007/0275704 A1* | 11/2007 | Terai | H04M 1/6066 |
| | | | 455/414.1 |
| 2013/0005257 A1* | 1/2013 | Rajaram | H04W 8/005 |
| | | | 455/41.2 |

FOREIGN PATENT DOCUMENTS

| | | |
|---|---|---|
| CN | 105407225 | 3/2016 |
| CN | 106681827 | 5/2017 |
| CN | 107135413 | 9/2017 |
| CN | 107528793 | 12/2017 |
| CN | 108260117 | 7/2018 |
| WO | WO 2019/16598 | 9/2019 |

* cited by examiner

BLUETOOTH TRANSMISSION CONTROL METHOD, CONTROL SYSTEM, AND STORAGE MEDIUM

RELATED APPLICATIONS

This application is a National Phase of PCT Patent Application No. PCT/CN2019/076365 having International filing date of Feb. 27, 2019, which claims the benefit of priority of Chinese Patent Application No. 201810166001.1 filed on Feb. 28, 2018. The contents of the above applications are all incorporated by reference as if fully set forth herein in their entirety.

FIELD AND BACKGROUND OF THE INVENTION

The present disclosure relates to the field of Bluetooth transmission technology, more particularly, to a Bluetooth transmission control method, a control system and a storage medium.

When a mobile terminal uses Bluetooth to transmit files, the transmitting parties will negotiate the data packet transmission timeout period. If the data packet transmission timeout occurs, the file transmission will be stopped. When the mobile terminal uses Bluetooth to play music and transmits files simultaneously, playing music through Bluetooth has a higher priority than transmitting files through Bluetooth. That is, if the data packet transmission fails, the mobile terminal will play music through Bluetooth and try to retransmit the data at the first moment. In this manner, when the mobile terminal plays music through Bluetooth and transmits files through Bluetooth concurrently, data packet loss occurs when playing music to cause several retransmissions, which is very easy to cause Bluetooth file transmission timeout. After the retransmission of the music data packets is over, the file transmission has been terminated due to timeout when it is expected that data packets of the transmitted file are transferred. The user needs to retransmit the file manually.

Therefore, there is a need to resolve the problems of the related art.

SUMMARY OF THE INVENTION

Technical Problem

The embodiment of the present disclosure provides a Bluetooth transmission control method, a control system and a storage medium, which can increase the Bluetooth file transmission timeout period when the mobile terminal simultaneously transmits the file and plays music through Bluetooth. The probability of successful Bluetooth file transmission by the mobile terminal is improved to be convenient for users.

Technical Solution

One aspect of the embodiment of the present disclosure provides a Bluetooth transmission control method. The Bluetooth transmission control method comprises:
  establishing a Bluetooth connection with a file receiving device by a mobile terminal, and the mobile terminal initiating a Bluetooth file transmission operation to the file receiving device;
  detecting whether the mobile terminal synchronously turns on a Bluetooth music playback operation or not;
  negotiating a file transmission timeout period with the file receiving device by the mobile terminal based on a detection result; and
  transmitting a file to the file receiving device by the mobile terminal.

Furthermore, the step of establishing the Bluetooth connection with the file receiving device by the mobile terminal, and the mobile terminal initiating the Bluetooth file transmission operation to the file receiving device comprises:
  establishing the Bluetooth connection with the file receiving device by the mobile terminal, and the mobile terminal and the file receiving device initiating Bluetooth after being successfully connected; and
  the mobile terminal initiating the Bluetooth file transmission operation to the file receiving device.

Furthermore, the step of detecting whether the mobile terminal synchronously turns on the Bluetooth music playback operation or not comprises:
  detecting whether the mobile terminal synchronously turns on the Bluetooth music playback operation or not when it is detected that the mobile terminal initiates the Bluetooth file transmission operation to the file receiving device.

Furthermore, the step of negotiating the file transmission timeout period with the file receiving device by the mobile terminal based on the detection result comprises:
  the mobile terminal negotiating with the file receiving device to determine a first timeout period for file transmission if the mobile terminal turns on the Bluetooth music playback operation synchronously; and
  the mobile terminal negotiating with the file receiving device to determine a second timeout period for the file transmission if the mobile terminal does not turn on the Bluetooth music playback operation synchronously;
  wherein the first timeout period is longer than the second timeout period, the second timeout period is a preset normal file transmission timeout period.

Furthermore, the step of transmitting the file to the file receiving device by the mobile terminal comprises:
  the mobile terminal starting transmitting the file to the file receiving device and synchronously monitoring whether the mobile terminal turns on the Bluetooth music playback operation or not after the mobile terminal negotiates with the file receiving device to determine the file transmission timeout period; and
  the mobile terminal renegotiating the file transmission timeout period with the file receiving device if it is monitored that the Bluetooth music playback operation changes from turn-on status to turn-off status or from turn-off status to turn-on status.

Furthermore, the step of the mobile terminal renegotiating the file transmission timeout period with the file receiving device comprises:
  the mobile terminal sending a negotiation data packet to the file receiving device, and requesting to reset the file transmission timeout period;
  the mobile terminal monitoring feedback information sent from the file receiving device; and
  the mobile terminal resetting the file transmission timeout period according to the feedback information.

Furthermore, the step of the mobile terminal resetting the file transmission timeout period according to the feedback information comprises:
  resetting the file transmission timeout period as the second timeout period and then continuing transmitting the file to the file receiving device when the feedback information is that a status of the Bluetooth music playback operation changes from turn-on status to turn-off status; and resetting the file transmission timeout period as the first timeout period and then continuing transmitting the file to the file receiving device when the feedback information is that the status of the Bluetooth music playback operation changes from turn-on status to turn-off status.

Furthermore, after the step of transmitting the file to the file receiving device by the mobile terminal, further comprises:

the mobile terminal stopping monitoring the Bluetooth music playback operation after file transmission between the mobile terminal and the file receiving device ends.

Another aspect of the embodiment of the present disclosure provides a Bluetooth transmission control system. The Bluetooth transmission control system comprises a mobile terminal and a file receiving device:

the mobile terminal establishing a Bluetooth connection with the file receiving device, the mobile terminal initiating a Bluetooth file transmission operation to the file receiving device, and detecting whether the mobile terminal synchronously turns on a Bluetooth music playback operation or not; the mobile terminal negotiating a file transmission timeout period with the file receiving device based on a detection result; and the mobile terminal transmitting a file to the file receiving device.

Furthermore, the negotiating the file transmission timeout period with the file receiving device by the mobile terminal based on the detection result comprises:

the mobile terminal negotiating with the file receiving device to determine a first timeout period for file transmission if the mobile terminal turns on the Bluetooth music playback operation synchronously; and the mobile terminal negotiating with the file receiving device to determine a second timeout period for the file transmission if the mobile terminal does not turn on the Bluetooth music playback operation synchronously;

wherein the first timeout period is longer than the second timeout period, the second timeout period is a preset normal file transmission timeout period.

Furthermore, the transmitting the file to the file receiving device by the mobile terminal comprises:

the mobile terminal starting transmitting the file to the file receiving device and synchronously monitoring whether the mobile terminal turns on the Bluetooth music playback operation or not after the mobile terminal negotiates with the file receiving device to determine the file transmission timeout period; and the mobile terminal renegotiating the file transmission timeout period with the file receiving device if it is monitored that the Bluetooth music playback operation changes from turn-on status to turn-off status or from turn-off status to turn-on status.

Furthermore, the mobile terminal renegotiating the file transmission timeout period with the file receiving device comprises:

the mobile terminal sending a negotiation data packet to the file receiving device, and requesting to reset the file transmission timeout period;

the mobile terminal monitoring feedback information sent from the file receiving device; and the mobile terminal resetting the file transmission timeout period according to the feedback information.

Furthermore, the mobile terminal resetting the file transmission timeout period according to the feedback information comprises:

resetting the file transmission timeout period as the second timeout period and then continuing transmitting the file to the file receiving device when the feedback information is that a status of the Bluetooth music playback operation changes from turn-on status to turn-off status; and resetting the file transmission timeout period as the first timeout period and then continuing transmitting the file to the file receiving device when the feedback information is that the status of the Bluetooth music playback operation changes from turn-on status to turn-off status.

Still another aspect of the embodiment of the present disclosure provides a computer readable storage medium storing one or more program instructions executable by one or more processors to perform operations comprising:

establishing a Bluetooth connection with a file receiving device by a mobile terminal, and the mobile terminal initiating a Bluetooth file transmission operation to the file receiving device;

detecting whether the mobile terminal synchronously turns on a Bluetooth music playback operation or not;

negotiating a file transmission timeout period with the file receiving device by the mobile terminal based on a detection result; and transmitting a file to the file receiving device by the mobile terminal.

Furthermore, the operation of negotiating the file transmission timeout period with the file receiving device by the mobile terminal based on the detection result comprises:

the mobile terminal negotiating with the file receiving device to determine a first timeout period for file transmission if the mobile terminal turns on the Bluetooth music playback operation synchronously; and the mobile terminal negotiating with the file receiving device to determine a second timeout period for the file transmission if the mobile terminal does not turn on the Bluetooth music playback operation synchronously;

wherein the first timeout period is longer than the second timeout period, the second timeout period is a preset normal file transmission timeout period.

Furthermore, the operation of transmitting the file to the file receiving device by the mobile terminal comprises:

the mobile terminal starting transmitting the file to the file receiving device and synchronously monitoring whether the mobile terminal turns on the Bluetooth music playback operation or not after the mobile terminal negotiates with the file receiving device to determine the file transmission timeout period; and the mobile terminal renegotiating the file transmission timeout period with the file receiving device if it is monitored that the Bluetooth music playback operation changes from turn-on status to turn-off status or from turn-off status to turn-on status.

Furthermore, the operation of the mobile terminal renegotiating the file transmission timeout period with the file receiving device comprises:

the mobile terminal sending a negotiation data packet to the file receiving device, and requesting to reset the file transmission timeout period;

the mobile terminal monitoring feedback information sent from the file receiving device; and the mobile terminal resetting the file transmission timeout period according to the feedback information.

Furthermore, the operation of the mobile terminal resetting the file transmission timeout period according to the feedback information comprises:

resetting the file transmission timeout period as the second timeout period and then continuing transmitting the file to the file receiving device when the feedback information is that a status of the Bluetooth music playback operation changes from turn-on status to turn-off status; and resetting the file transmission timeout period as the first timeout period and then continuing transmitting the file to the file receiving device when the feedback information is that the status of the Bluetooth music playback operation changes from turn-on status to turn-off status.

Furthermore, the step of the mobile terminal resetting the file transmission timeout period according to the feedback information comprises:

the mobile terminal considering that the file receiving device refuses to reset the file transmission timeout period when the mobile terminal receives a rejection instruction sent by the file receiving device or does not receive a feedback on the negotiation data packet to maintain the first timeout period and then continue transmitting the file to the file receiving device.

Furthermore, after the operation of transmitting the file to the file receiving device by the mobile terminal, further comprises:

the mobile terminal stopping monitoring the Bluetooth music playback operation after file transmission between the mobile terminal and the file receiving device ends.

Advantageous Effects

The present disclosure provides a Bluetooth transmission control system, a control system and a storage medium. The Bluetooth transmission control method comprises: establishing a Bluetooth connection with a file receiving device by a mobile terminal, and the mobile terminal initiating a Bluetooth file transmission operation to the file receiving device; detecting whether the mobile terminal synchronously turns on a Bluetooth music playback operation or not; negotiating a file transmission timeout period with the file receiving device by the mobile terminal based on a detection result; and transmitting a file to the file receiving device by the mobile terminal. The present disclosure increases the Bluetooth file transmission timeout period when the mobile terminal simultaneously transmits the file through Bluetooth and plays music through Bluetooth concurrently. The probability of successful transmission of the shared Bluetooth file by the mobile terminal is improved to be convenient for users.

DESCRIPTION OF SPECIFIC EMBODIMENTS OF THE INVENTION

For the purpose of description rather than limitation, the following provides such specific details as a specific system structure, interface, and technology for a thorough understanding of the application. However, it is understandable by persons skilled in the art that the application can also be implemented in other embodiments not providing such specific details. In other cases, details of a well-known apparatus, circuit and method are omitted to avoid hindering the description of the application by unnecessary details.

Figure 1:
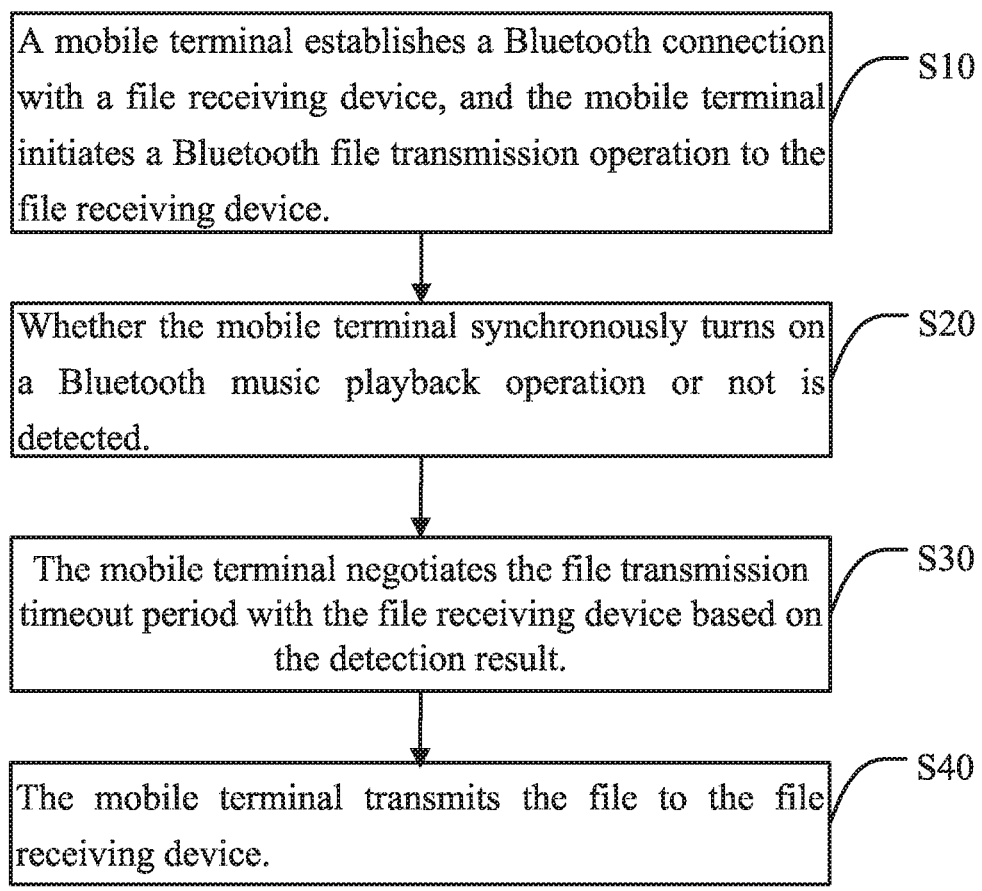
FIG. 1 is a flowchart of a Bluetooth transmission control method according to one embodiment of the present disclosure.

A description is provided with reference to FIG. 1. FIG. 1 is a flowchart of a Bluetooth transmission control method according to the present disclosure. The Bluetooth transmission control method can be applied to Bluetooth transmission(s) between multiple electronic devices, and can renegotiate the file transmission timeout period when Bluetooth music is played to avoid frequent interruptions of file transmission when playing music. Exemplarily, while transmitting a file between two mobile phones, one of the mobile phones is connected to a Bluetooth speaker to perform a music playback operation. It should be noted that the Bluetooth transmission control method according to the embodiment of the present disclosure is not limited to the steps and sequence in the flowchart shown in FIG. 1. The steps in the flowchart may be added, removed or changed in sequence depending on different needs.

Although in the following description the Bluetooth transmission control method is described as being performed between two mobile phones and a Bluetooth speaker. However, this is only used to facilitate the description of the present disclosure, and is not intended to limit the present disclosure. The Bluetooth transmission control method according to the embodiment of the present disclosure can be applied to all electronic devices with Bluetooth function, and the electronic device may be any device, such as a mobile terminal, a vehicle terminal, a fixed terminal, etc.

As shown in FIG. 1, the Bluetooth transmission control method according to the present disclosure comprises the following steps;

S10. A mobile terminal establishes a Bluetooth connection with a file receiving device, and the mobile terminal initiates a Bluetooth file transmission operation to the file receiving device.

According to the embodiment of the present disclosure, after multiple electronic devices turn on Bluetooth and are successfully connected to each other, they can achieve a file transmission operation through Bluetooth. For example, after two mobile phones turn on Bluetooth and are connected, one of the mobile phones transmits a file to another one of the mobile phones so as to achieve the file transmission operation.

The mobile terminal initiates the Bluetooth file transmission operation to the file receiving device. When the Bluetooth file transmission operation is detected, the operation is intercepted to avoid frequent interruptions of file transmission caused by music that is currently played. The frequent interruptions of file transmission in turn require multiple manual retransmissions.

In some embodiments, the interception operation may be an automatic interception. When it is detected that the file is transmitted through Bluetooth, this operation is automatically intercepted. After the interception, starting transmitting the file to the file receiving device (such as the another one of the mobile phones) is prevented.

In some other embodiments, the interception operation is a manual operation. For example, when it is detected that the file is transmitted through Bluetooth, an interactive window pops up to prompt a user to select continuous transmission or smart transmission. If the user selects continuous transmission, the Bluetooth file transmission is performed by using a normal file transmission timeout period according to the normal protocol. If the user selects smart transmission, the Bluetooth file transmission is performed after a relevant negotiation.

S20. Whether the mobile terminal synchronously turns on a Bluetooth music playback operation or not is detected.

After intercepting the Bluetooth file transmission operation, it is necessary to detect whether the device that transmits the file (such as a mobile terminal) synchronously performs a music playback operation or not so as to judge whether a Bluetooth music playback and the Bluetooth file transmission are performed synchronously or not in a next step of the file transmission process. The negotiation of the file transmission timeout period is thus facilitated.

In some embodiments, the detection of whether the Bluetooth music playback operation is turned on or not is automatically performed by the device, and whether to pop up the interactive window or not is determined according to the detection result. If it is detected that the Bluetooth music playback operation is turned on, the interactive window will pop up to prompt the user to select continuous transmission or smart transmission. If smart transmission is selected, the mobile terminal renegotiates with the file receiving device to determine the file transmission timeout period, and starts the file transmission after the file transmission timeout period is determined.

In some other embodiments, the detection of whether the Bluetooth music playback operation is turned on or not may be performed by the user manually. For example, after intercepting the Bluetooth file transmission operation, a pop-up window prompts whether to perform a detection of the Bluetooth music playback operation or not, and the user decides whether to perform a detection operation or not.

S30. The mobile terminal negotiates the file transmission timeout period with the file receiving device based on the detection result.

Based on the detection result, it can be determined whether the Bluetooth music playback and the Bluetooth file transmission are performed simultaneously or not in the next step of the file transmission process. Different file transmission timeout periods are set based on whether the Bluetooth music playback and the Bluetooth file transmission are performed simultaneously or not.

In some embodiments, the mobile terminal negotiating the file transmission timeout period with the file receiving device based on the detection result comprises:

S301. If the mobile terminal turns on the Bluetooth music playback operation synchronously, the mobile terminal negotiates with the file receiving device to determine a first timeout period for file transmission.

S302. If the mobile terminal does not turn on the Bluetooth music playback operation synchronously, the mobile terminal negotiates with the file receiving device to determine a second timeout period for file transmission.

The first timeout period is longer than the second timeout period. The second timeout period is the preset normal file transmission timeout period.

When the Bluetooth music playback operation is turned on, it means that the Bluetooth music playback and the Bluetooth file transmission are performed simultaneously during the file transmission process. Since the Bluetooth music playback has a higher priority, the file transmission is possibly affected to cause the file transmission to be interrupted due to timeout. Therefore, at this time it is necessary to renegotiate with the file receiving device to determine a longer file transmission timeout period (that is, the first timeout period). The first timeout period is longer than the normal file transmission timeout period, so as not to interrupt the file transmission due to timeout when playing music.

When the user selects smart transmission, then the negotiation is automatically performed to determine the file transmission timeout period, and the file transmission is automatically started after the file transmission timeout period is determined through the negotiation.

When the Bluetooth music playback operation is turned off, that is, the mobile terminal does not turn on the Bluetooth music playback operation simultaneously. It means that there are no interferences from the Bluetooth music playback during the file transmission process. Therefore, only setting the file transmission timeout period as the normal file transmission timeout period is enough.

S40. The mobile terminal transmits the file to the file receiving device.

After determining the interference relationship between the Bluetooth music playback and the Bluetooth file transmission, the file transmission can be started.

In some embodiments, the mobile terminal transmitting the file to the file receiving device comprises:

S401. After the mobile terminal negotiates with the file receiving device to determine the file transmission timeout period, the mobile terminal starts transmitting the file to the file receiving device, and synchronously monitors whether the mobile terminal turns on the Bluetooth music playback operation or not.

S402. If it is monitored that the Bluetooth music playback operation changes from turn-on status to turn-off status or from turn-off status to turn-on status, the mobile terminal renegotiates the file transmission timeout period with the file receiving device.

If the Bluetooth music playback operation is turned off at the beginning, the file transmission timeout period set at the beginning is the second timeout period, that is, the normal file transmission timeout period. If the Bluetooth music playback operation is turned on during the file transmission process, the file transmission is still affected. In addition, since the Bluetooth music playback has a higher priority than file transmission, frequent interruptions of file transmission are still possibly caused. Therefore, it is necessary to monitor the Bluetooth music playback operation during the transmission process. After monitoring that the Bluetooth music playback operation is turned on, the mobile terminal renegotiates with the file receiving device in time to determine the file transmission timeout period, and reset the file transmission timeout period as the first timeout period. Those skilled in the art would understand that the first timeout period is not a fixed time period but can be set, and is usually set as a longer timeout period to avoid interruptions of file transmission.

On the contrary, if the Bluetooth music playback operation is turned on at the beginning, the file transmission timeout period set at the beginning is the first timeout period. If the Bluetooth music playback operation changes from turn-on status to turn-off status, then a negotiation can be made at this time to reset the file transmission timeout period from the first timeout period to the second timeout period. Of course, the first timeout period can be maintained.

The mobile terminal renegotiating the file transmission timeout period with the file receiving device comprises:

S403. The mobile terminal sends a negotiation data packet to the file receiving device, and requests to reset the file transmission timeout period.

S404: The mobile terminal monitors feedback information sent from the file receiving device.

S405: The mobile terminal resets the file transmission timeout period according to the feedback information.

After a status of the Bluetooth music playback operation changes, such as from turn-on status to turn-off status or from turn-off status to turn-on status, the reset of the file transmission timeout period can be triggered. At this time, the mobile terminal sends the negotiation data packet to the file receiving device, and negotiates to reset the file transmission time period. After the Bluetooth music playback operation changes from turn-off status to turn-on status, the file transmission timeout period can be reset from the second timeout period to the first timeout period. After the Bluetooth music playback operation changes from turn-on status to turn-off status, the file transmission timeout period can be reset from the first timeout period to the second timeout period, or can be maintained as the first timeout period. If the first timeout period needs to be maintained, the file receiving device is required to send a rejection instruction or not to feedback on the negotiation data packet. At this time, the mobile terminal will consider that the file receiving device refuses to reset the file transmission timeout period.

The above Bluetooth transmission control method determines whether to reset the file transmission timeout period or not through detecting the Bluetooth music playback operation so as to avoid the problem of frequent interruptions caused by file transmission when playing music through Bluetooth.

After the file transmission between the mobile terminal and the file receiving device ends, the mobile terminal stops monitoring the Bluetooth music playback operation.

Figure 2:
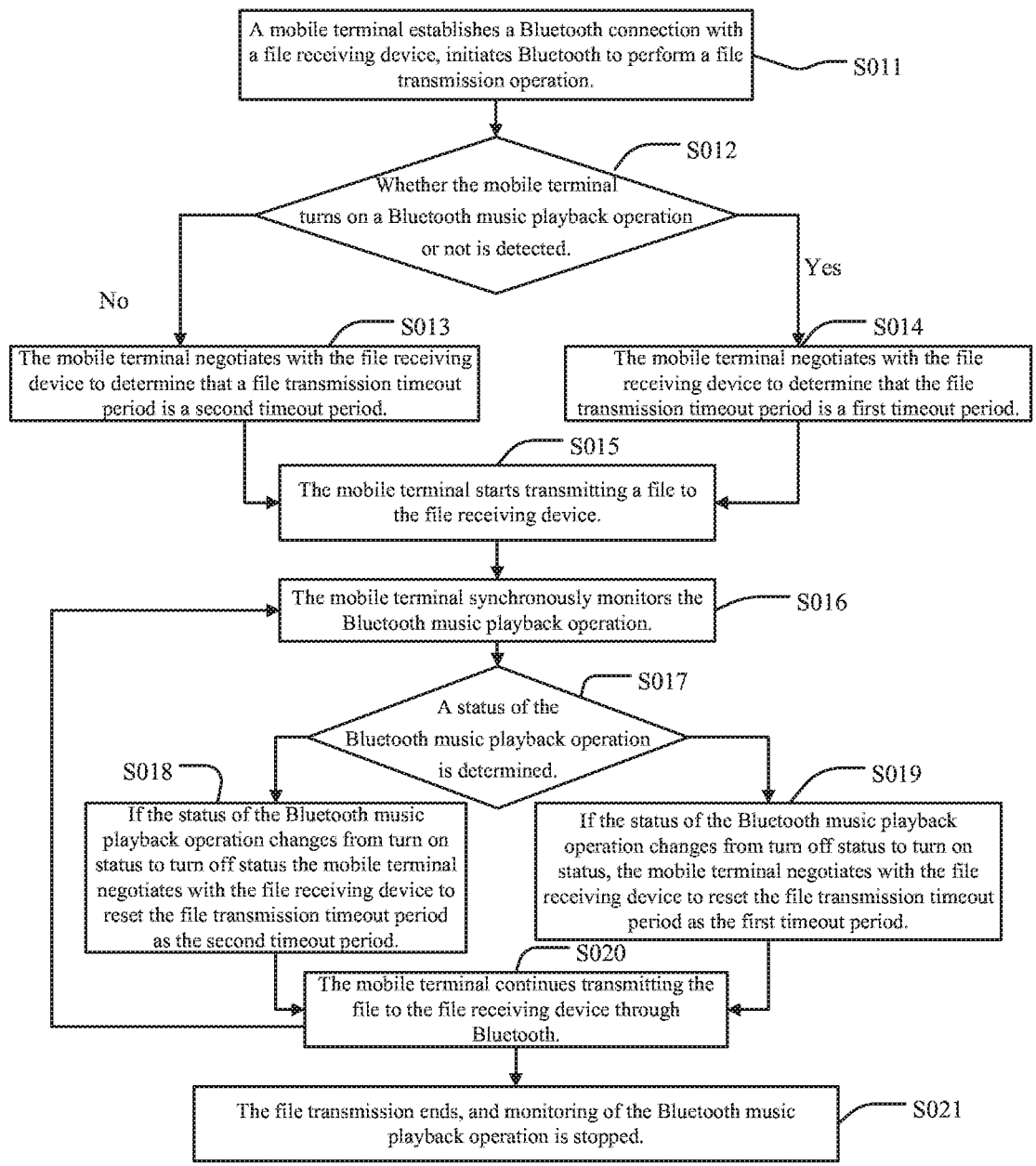
FIG. 2 is a detailed flowchart of a Bluetooth transmission control method according to one embodiment of the present disclosure.

In order to better understand the Bluetooth transmission control method of the present disclosure, an embodiment is provide for illustrative purposes, as shown in FIG. 2.

S011. A mobile terminal establishes a Bluetooth connection with a file receiving device, initiates Bluetooth to perform a file transmission operation, and then executes S012.

S012. Whether the mobile terminal turns on a Bluetooth music playback operation or not is detected. If yes, execute S014, if not, execute S013.

S013. The mobile terminal negotiates with the file receiving device to determine that a file transmission timeout period is a second timeout period, and then executes S015.

S014. The mobile terminal negotiates with the file receiving device to determine that the file transmission timeout period is a first timeout period, and then executes S015.

S015. The mobile terminal starts transmitting a file to the file receiving device, and then executes S016.

S016. The mobile terminal synchronously monitors the Bluetooth music playback operation, and then executes S017.

S017. A status of the Bluetooth music playback operation of the mobile terminal is determined, and then executes S018 or S019.

S018. If the status of the Bluetooth music playback operation changes from turn-on status to turn-off status, the mobile terminal negotiates with the file receiving device to reset the file transmission timeout period as the second timeout period, and then executes S020.

S019. If the status of the Bluetooth music playback operation changes from turn-off status to turn-on status, the mobile terminal negotiates with the file receiving device to reset the file transmission timeout period as the first timeout period, and then executes S020.

S020. The mobile terminal continues transmitting the file to the file receiving device through Bluetooth, simultaneously executes S016 continuously until file transmission ends, and then executes S021.

S021. The file transmission ends, and monitoring of the Bluetooth music playback operation is stopped.

Additionally, the Bluetooth transmission control methods according to the foregoing embodiments of the present disclosure detect the Bluetooth file transmission operation at the beginning. In some embodiments, it is also possible not to detect the Bluetooth file transmission operation at the beginning, but monitor the Bluetooth music playback operation after establishing the Bluetooth connection and starting the file transmission. If it is monitored that the Bluetooth music playback operation is turned on, the mobile terminal renegotiates the file transmission timeout period with the file receiving device. Since the relevant transmission principle and corresponding operations are basically the same as the above Bluetooth transmission control method, a description in this regard is not provided.

Figure 3:
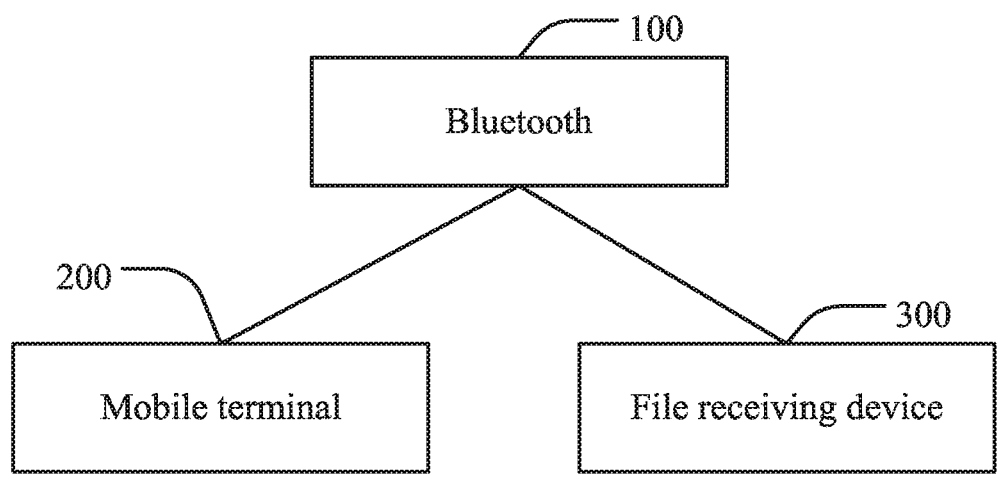
FIG. 3 is a structural block diagram of a Bluetooth transmission control system according to the present invention.

The present disclosure further provides a Bluetooth transmission control system, correspondingly. As shown in FIG. 3, the Bluetooth transmission control system comprises a mobile terminal 200 and a file receiving device 300, and the mobile terminal 200 and the file receiving device 300 perform transmission through Bluetooth 100. The mobile terminal 200 may be a computing device, such as a mobile phone, a desktop computer, a notebook computer, a palmtop computer, or a server, etc. The file receiving device 300 may be any device with Bluetooth function, such as a mobile terminal, a vehicle terminal, a fixed terminal, etc.

The working process of the Bluetooth transmission control system is as follows. The mobile terminal 200 establishes a Bluetooth connection with the file receiving device 300. The mobile terminal 200 initiates a Bluetooth file transmission operation to the file receiving device 300, and detects whether the mobile terminal 200 synchronously turns on a Bluetooth music playback operation or not. The mobile terminal 200 negotiates a file transmission timeout period with the file receiving device 300 based on a detection result. The mobile terminal 200 transmits a file to the file receiving device 300 to implement the above Bluetooth transmission control method.

Figure 4:
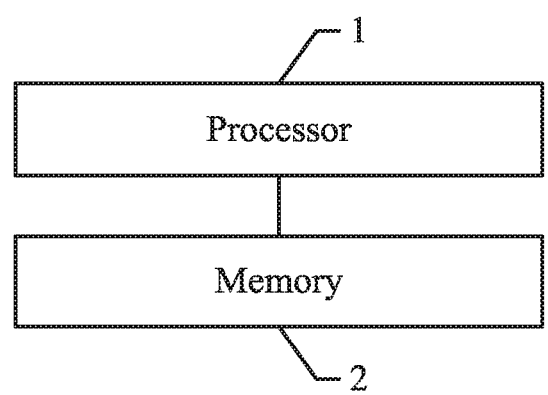
FIG. 4 is a block diagram showing functional principle of a mobile terminal according to the present invention.

In greater detail, the mobile terminal 200 comprises a processor 1 and a memory 2, as shown in FIG. 4. FIG. 4 only shows part of the components of the mobile terminal. However, it should be understood that it is not required to implement by using all of the illustrated components, and more or less components may be used.

In some embodiments, the memory 2 may be an internal storage unit of the mobile terminal, such as a memory of the mobile terminal. In some other embodiments, the memory 2 may be an external storage device of the mobile terminal, such as a plug-in U disk, a smart memory card (SMC), a secure digital (SD) card, a flash card, etc., equipped on the mobile terminal. In greater detail, the memory 2 may further comprise not only the internal storage unit of the mobile terminal but also the external storage device. The memory 2 is configured to store application software and various data installed in the mobile terminal, such as Bluetooth transmission control program codes, etc. The memory 2 may further be configured to temporarily store data that have been output or will be output. The memory 2 stores a Bluetooth transmission control program. The Bluetooth transmission control program can be executed by the processor 1 to realize the Bluetooth transmission control method of the present disclosure.

The processor 1 may be a central processing unit (CPU), a microprocessor, a mobile phone baseband processor or some other data processing chip, and is configured to run the program codes or processing data stored in the memory 2, for example, perform the Bluetooth transmission control method and the like.

The present disclosure further provides a computer-readable storage medium. The computer-readable storage medium stores one or more programs. The one or more programs can be executed by one or more processors to realize the steps in the Bluetooth transmission control method of the present disclosure.

Figure 5:
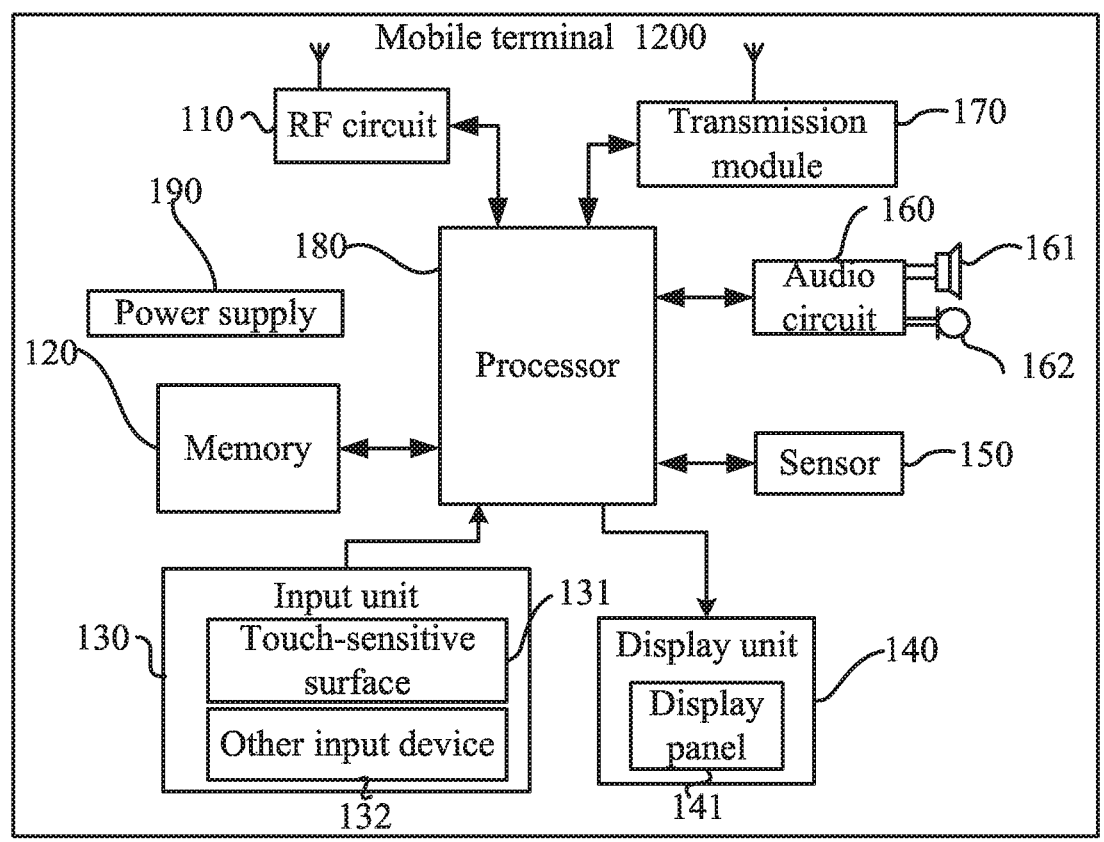
FIG. 5 is a detailed schematic structure diagram of a mobile terminal according to one embodiment of the present disclosure.

FIG. 5 is a block diagram of a detailed structure of a mobile terminal according to one embodiment of the present disclosure. The mobile terminal can be used to perform the Bluetooth transmission control method according to the above embodiment. The mobile terminal 1200 may be a smart phone or a tablet computer.

As shown in FIG. 5, the mobile terminal 1200 may comprise components, such as a radio frequency (RF) circuit 110, a memory 120 including one or more (only one is shown in the figure) computer-readable storage media, an input unit 130, a display unit 140, a sensor 150, an audio circuit 160, a transmission module 170, a processor 180 including one or more (only one is shown in the figure) processing cores, and a power supply 190, etc. Those skilled in the art would understand that the mobile terminal 1200 is not limited to the structure of the mobile terminal 1200 shown in FIG. 5. The mobile terminal 1200 may comprise more or less components than those illustrated in the figure, or some components may be combined, or the mobile terminal 1200 may have different component arrangements.

The RF circuit 110 may be configured to receive and send a signal during an information receiving and sending process or a conversation process. Specifically, after receiving downlink information from a base station, the RF circuit 110 delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by wireless communication. The wireless communication may use any communications standard or protocol, which includes, but is not limited to, a Global System for Mobile communications (GSM), an Enhanced Data GSM Environment (EDGE), a Wideband Code Division Multiple Access (WCDMA), a Code Division Access (CDMA), a Time Division Multiple Access (TDMA), a Wireless Fidelity (Wi-Fi) such as IEEE 802.11a, IEEE 802.11b, IEEE802.11g and IEEE 802.11n, a Voice over Internet Protocol (VoIP), a Worldwide Interoperability for Microwave Access (Wi-Max), any other protocols for e-mail, instant communication and short message, and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 1200, and the like. In addition, the memory 120 may include a high speed random access memory, and may also include a non-volatile memory, such as at least one magnetic disk storage device, a flash memory device, or another volatile solid-state storage device. Correspondingly, the memory 120 may further include a memory controller, so that the processor 180 and the input unit 130 access the memory 120.

The input unit 130 may be configured to receive input digit or character information, and generate keyboard, mouse, joystick, optical, or track ball signal input related to the user setting and function control. Specifically, the input unit 130 may include a touch-sensitive surface 131 and other input device 132. The touch-sensitive surface 131 may also be referred to as a touch screen or a touch panel, and may collect a touch operation of a user on or near the touch-sensitive surface (such as an operation of a user on or near the touch-sensitive surface 131 by using any suitable object or attachment, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be implemented by using various types, such as a resistive type, a capacitance type, an infrared type, and a surface sound wave type. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user ports of the terminal 1200. The graphical user ports may be formed by a graph, a text, an icon, a video, and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine a type of a touch event. Then, the processor 180 provides corresponding visual output on the display panel 141 according to the type of the touch event. Although, in FIG. 5, the touch-sensitive surface 131 and the display panel 141 are used as two separate parts to implement input and output functions, in some embodiments, the touch-sensitive surface 131 and the display panel 141 may be integrated to implement the input and output functions.

The terminal 1200 may further include at least one sensor 150, such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 1200 is moved to the ear. As one type of motion sensor, a gravity acceleration sensor may detect magnitude of accelerations at various directions (which generally are triaxial), may detect magnitude and a direction of the gravity when static, and may be configured to identify an application of a mobile phone attitude (such as switching between horizontal and vertical screens, a related game, and attitude calibration of a magnetometer), a related function of vibration identification (such as a pedometer and a knock). Other sensors, such as a gyroscope, a barometer, a hygrometer, a thermometer, and an infrared sensor, which may be configured in the terminal 1200 are not further described herein.

The audio circuit 160, a loudspeaker 161, and a microphone 162 may provide audio interfaces between the user and the terminal 1200. The audio circuit 160 may transmit, to the loudspeaker 161, a received electric signal converted from received audio data. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the terminal 1200.

The terminal 1200 may help, by using the transmission module 170 (e.g. Wi-Fi module), a user to receive and send an e-mail, browse a webpage, and access stream media, and the like, which provides wireless broadband Internet access for the user. Although FIG. 5 shows the transmission module 170, it may be understood that, the wireless communications unit is not a necessary component of the terminal 1200, and can be ignored according to demands without changing the scope of the essence of the present disclosure.

The processor 180 is a control center of the terminal 1200, and connects various parts of the terminal by using various interfaces and lines. By running or executing the software program and/or module stored in the memory 120, and invoking data stored in the memory 120, the processor 180 performs various functions and data processing of the terminal 1200, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like. The modem mainly processes wireless communication. It may be understood that, the foregoing modem may not be integrated into the processor 180.

The terminal 1200 further includes the power supply 190 (such as a battery) for supplying power to the components. Preferably, the power supply may be logically connected to the processor 180 by using a power supply management system, thereby implementing functions, such as charging, discharging, and power consumption management, by using the power supply management system. The power supply 190 may further include any component, such as one or more direct current or alternate current power supplies, a re-charging system, a power supply fault detection circuit, a power supply converter or an inverter, and a power supply state indicator.

Although not shown, the mobile terminal 1200 may further comprise a camera (such as a front camera, a rear camera), a Bluetooth module, and the like, and a description in this regard is not provided. In greater detail, a display unit of the mobile terminal 1200 is a touch screen display according to the present embodiment. The mobile terminal 1200 further comprises a memory and one or more programs. The one or more programs are stored in the memory, and are configured to be executed by one or more processors to perform operations comprising:

establishing a Bluetooth connection with a file receiving device by a mobile terminal, and the mobile terminal initiating a Bluetooth file transmission operation to the file receiving device;

detecting whether the mobile terminal synchronously turns on a Bluetooth music playback operation or not;

negotiating a file transmission timeout period with the file receiving device by the mobile terminal based on a detection result; and transmitting a file to the file receiving device by the mobile terminal.

Furthermore, the operation of negotiating the file transmission timeout period with the file receiving device by the mobile terminal based on the detection result comprises:

the mobile terminal negotiating with the file receiving device to determine a first timeout period for file transmission if the mobile terminal turns on the Bluetooth music playback operation synchronously; and the mobile terminal negotiating with the file receiving device to determine a second timeout period for the file transmission if the mobile terminal does not turn on the Bluetooth music playback operation synchronously;

wherein the first timeout period is longer than the second timeout period, the second timeout period is a preset normal file transmission timeout period.

Furthermore, the operation of transmitting the file to the file receiving device by the mobile terminal comprises:

the mobile terminal starting transmitting the file to the file receiving device and synchronously monitoring whether the mobile terminal turns on the Bluetooth music playback operation or not after the mobile terminal negotiates with the file receiving device to determine the file transmission timeout period; and the mobile terminal renegotiating the file transmission timeout period with the file receiving device if it is monitored that the Bluetooth music playback operation changes from turn-on status to turn-off status or from turn-off status to turn-on status.

Furthermore, the operation of the mobile terminal renegotiating the file transmission timeout period with the file receiving device comprises:

the mobile terminal sending a negotiation data packet to the file receiving device, and requesting to reset the file transmission timeout period;

the mobile terminal monitoring feedback information sent from the file receiving device; and the mobile terminal resetting the file transmission timeout period according to the feedback information.

Furthermore, the operation of the mobile terminal resetting the file transmission timeout period according to the feedback information comprises:

resetting the file transmission timeout period as the second timeout period and then continuing transmitting the file to the file receiving device when the feedback information is that a status of the Bluetooth music playback operation changes from turn-on status to turn-off status; and resetting the file transmission timeout period as the first timeout period and then continuing transmitting the file to the file receiving device when the feedback information is that the status of the Bluetooth music playback operation changes from turn-on status to turn-off status.

Furthermore, the step of the mobile terminal resetting the file transmission timeout period according to the feedback information comprises:

the mobile terminal considering that the file receiving device refuses to reset the file transmission timeout period when the mobile terminal receives a rejection instruction sent by the file receiving device or does not receive a feedback on the negotiation data packet to maintain the first timeout period and then continue transmitting the file to the file receiving device.

Furthermore, after the operation of transmitting the file to the file receiving device by the mobile terminal, further comprises:

the mobile terminal stopping monitoring the Bluetooth music playback operation after file transmission between the mobile terminal and the file receiving device ends.

Consequently, the present disclosure provides a Bluetooth transmission control system, a control system and a storage medium. The Bluetooth transmission control method comprises: establishing a Bluetooth connection with a file receiving device by a mobile terminal, and the mobile terminal initiating a Bluetooth file transmission operation to the file receiving device; detecting whether the mobile terminal synchronously turns on a Bluetooth music playback operation or not; negotiating a file transmission timeout period with the file receiving device by the mobile terminal based on a detection result; and transmitting a file to the file receiving device by the mobile terminal. The present disclosure increases the Bluetooth file transmission timeout period when the mobile terminal simultaneously transmits the file through Bluetooth and plays music through Bluetooth concurrently. The probability of successful transmission of the shared Bluetooth file by the mobile terminal is improved to be convenient for users. Of course, a person of ordinary skill in the art can understand that all or part of the processes in the methods of the foregoing embodiments can be implemented by instructing relevant hardware (such as a processor, a controller, etc.) through a computer program. The program may be stored in a computer-readable storage medium, and the program may include the processes of the above various method embodiments when being executed. The storage medium may be a memory, a magnetic disk, an optical disc, and the like.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. A Bluetooth transmission control method comprising steps:

establishing a Bluetooth connection with a file receiving device by a mobile terminal, and the mobile terminal initiating a Bluetooth file transmission operation to the file receiving device;

detecting whether the mobile terminal synchronously turns on a Bluetooth music playback operation or not when it is detected that the mobile terminal initiates the Bluetooth file transmission operation to the file receiving device;

the mobile terminal negotiating with the file receiving device to determine a first timeout period for file transmission if the mobile terminal turns on the Bluetooth music playback operation synchronously; and the mobile terminal negotiating with the file receiving device to determine a second timeout period for the file transmission if the mobile terminal does not turn on the Bluetooth music playback operation synchronously, wherein the first timeout period is longer than the second timeout period, the second timeout period is a preset normal file transmission timeout period;

transmitting a file to the file receiving device by the mobile terminal.

2. The Bluetooth transmission control method as claimed in claim 1, wherein the step of establishing the Bluetooth connection with the file receiving device by the mobile terminal, and the mobile terminal initiating the Bluetooth file transmission operation to the file receiving device comprises:

establishing the Bluetooth connection with the file receiving device by the mobile terminal, and the mobile terminal and the file receiving device initiating Bluetooth after being successfully connected; and the mobile terminal initiating the Bluetooth file transmission operation to the file receiving device.

3. The Bluetooth transmission control method as claimed in claim 1, wherein the step of transmitting the file to the file receiving device by the mobile terminal comprises:

the mobile terminal starting transmitting the file to the file receiving device and synchronously monitoring whether the mobile terminal turns on the Bluetooth music playback operation or not after the mobile terminal negotiates with the file receiving device to determine the file transmission timeout period; and the mobile terminal renegotiating the file transmission timeout period with the file receiving device if it is monitored that the Bluetooth music playback operation changes from turn-on status to turn-off status or from turn-off status to turn-on status.

4. The Bluetooth transmission control method as claimed in claim 3, wherein the step of the mobile terminal renegotiating the file transmission timeout period with the file receiving device comprises:

the mobile terminal sending a negotiation data packet to the file receiving device, and requesting to reset the file transmission timeout period;

the mobile terminal monitoring feedback information sent from the file receiving device; and the mobile terminal resetting the file transmission timeout period according to the feedback information.

5. The Bluetooth transmission control method as claimed in claim 4, wherein the step of the mobile terminal resetting the file transmission timeout period according to the feedback information comprises:

resetting the file transmission timeout period as the second timeout period and then continuing transmitting the file to the file receiving device when the feedback information is that a status of the Bluetooth music playback operation changes from turn-on status to turn-off status; and resetting the file transmission timeout period as the first timeout period and then continuing transmitting the file to the file receiving device when the feedback information is that the status of the Bluetooth music playback operation changes from turn-on status to turn-off status.

6. The Bluetooth transmission control method as claimed in claim 1, wherein after the step of transmitting the file to the file receiving device by the mobile terminal, further comprises:

the mobile terminal stopping monitoring the Bluetooth music playback operation after file transmission between the mobile terminal and the file receiving device ends.

7. A Bluetooth transmission control system comprising a mobile terminal and a file receiving device:

the mobile terminal establishing a Bluetooth connection with the file receiving device, the mobile terminal initiating a Bluetooth file transmission operation to the file receiving device, and detecting whether the mobile terminal synchronously turns on a Bluetooth music playback operation or not; the mobile terminal negotiating with the file receiving device to determine a first timeout period for file transmission if the mobile terminal turns on the Bluetooth music playback operation synchronously; the mobile terminal negotiating with the file receiving device to determine a second timeout period for the file transmission if the mobile terminal does not turn on the Bluetooth music playback operation synchronously, wherein the first timeout period is longer than the second timeout period, the second timeout period is a preset normal file transmission timeout period; and the mobile terminal transmitting a file to the file receiving device.

8. The Bluetooth transmission control system as claimed in claim 7, wherein the transmitting the file to the file receiving device by the mobile terminal comprises:

the mobile terminal starting transmitting the file to the file receiving device and synchronously monitoring whether the mobile terminal turns on the Bluetooth music playback operation or not after the mobile terminal negotiates with the file receiving device to determine the file transmission timeout period; and the mobile terminal renegotiating the file transmission timeout period with the file receiving device if it is monitored that the Bluetooth music playback operation changes from turn-on status to turn-off status or from turn-off status to turn-on status.

9. The Bluetooth transmission control system as claimed in claim 8, wherein the mobile terminal renegotiating the file transmission timeout period with the file receiving device comprises:

the mobile terminal sending a negotiation data packet to the file receiving device, and requesting to reset the file transmission timeout period;

the mobile terminal monitoring feedback information sent from the file receiving device; and the mobile terminal resetting the file transmission timeout period according to the feedback information.

10. The Bluetooth transmission control system as claimed in claim 9, wherein the mobile terminal resetting the file transmission timeout period according to the feedback information comprises:

resetting the file transmission timeout period as the second timeout period and then continuing transmitting the file to the file receiving device when the feedback information is that a status of the Bluetooth music playback operation changes from turn-on status to turn-off status; and resetting the file transmission timeout period as the first timeout period and then continuing transmitting the file to the file receiving device when the feedback information is that the status of the Bluetooth music playback operation changes from turn-on status to turn-off status.

11. A non-transitory computer readable storage medium storing one or more program instructions executable by one or more processors in a mobile terminal to perform operations comprising:

establishing a Bluetooth connection with a file receiving device by a mobile terminal, and the mobile terminal initiating a Bluetooth file transmission operation to the file receiving device;

detecting whether the mobile terminal synchronously turns on a Bluetooth music playback operation or not;

negotiating, by the mobile terminal, with the file receiving device to determine a first timeout period for file transmission if the mobile terminal turns on the Bluetooth music playback operation synchronously; and negotiating, by the mobile terminal, with the file receiving device to determine a second timeout period for the file transmission if the mobile terminal does not turn on the Bluetooth music playback operation synchronously, wherein the first timeout period is longer than the second timeout period, the second timeout period is a preset normal file transmission timeout period; and transmitting a file to the file receiving device by the mobile terminal.

12. The non-transitory computer readable storage medium as claimed in claim 11, wherein the operation of transmitting the file to the file receiving device by the mobile terminal comprises:

the mobile terminal starting transmitting the file to the file receiving device and synchronously monitoring whether the mobile terminal turns on the Bluetooth music playback operation or not after the mobile terminal negotiates with the file receiving device to determine the file transmission timeout period; and the mobile terminal renegotiating the file transmission timeout period with the file receiving device if it is monitored that the Bluetooth music playback operation changes from turn-on status to turn-off status or from turn-off status to turn-on status.

13. The non-transitory computer readable storage medium as claimed in claim 12, wherein the operation of the mobile terminal renegotiating the file transmission timeout period with the file receiving device comprises:

the mobile terminal sending a negotiation data packet to the file receiving device, and requesting to reset the file transmission timeout period;

the mobile terminal monitoring feedback information sent from the file receiving device; and the mobile terminal resetting the file transmission timeout period according to the feedback information.

14. The non-transitory computer readable storage medium as claimed in claim 13, wherein the operation of the mobile terminal resetting the file transmission timeout period according to the feedback information comprises:
 resetting the file transmission timeout period as the second timeout period and then continuing transmitting the file to the file receiving device when the feedback information is that a status of the Bluetooth music playback operation changes from turn-on status to turn-off status; and
 resetting the file transmission timeout period as the first timeout period and then continuing transmitting the file to the file receiving device when the feedback information is that the status of the Bluetooth music playback operation changes from turn-on status to turn-off status.

15. The non-transitory computer readable storage medium as claimed in claim 13, wherein the operation of the mobile terminal resetting the file transmission timeout period according to the feedback information comprises:
 the mobile terminal considering that the file receiving device refuses to reset the file transmission timeout period when the mobile terminal receives a rejection instruction sent by the file receiving device or does not receive a feedback on the negotiation data packet to maintain the first timeout period and then continue transmitting the file to the file receiving device.

16. The non-transitory computer readable storage medium as claimed in claim 11, wherein after the operation of transmitting the file to the file receiving device by the mobile terminal, further comprises:
 the mobile terminal stopping monitoring the Bluetooth music playback operation after file transmission between the mobile terminal and the file receiving device ends.

\* \* \* \* \*